United States Patent
Daas et al.

(10) Patent No.: US 10,076,086 B2
(45) Date of Patent: Sep. 18, 2018

(54) APPARATUS FOR BREEDING PLANTS

(75) Inventors: Kamal Daas, Bergschenhoek (NL); Talal Daas, Naperville, IL (US); Peter Van Der Drift, Bleiswijk (NL)

(73) Assignee: HORTICOOP B.V. (NL)

( * ) Notice: Subject to any disclaimer, the term of this patent is extended or adjusted under 35 U.S.C. 154(b) by 360 days.

(21) Appl. No.: 13/239,873

(22) Filed: Sep. 22, 2011

(65) Prior Publication Data
US 2012/0124907 A1    May 24, 2012

(30) Foreign Application Priority Data
Sep. 23, 2010 (DE) .................... 20 2010 013 543 U

(51) Int. Cl.
| | | |
|---|---|---|
| A01G 9/00 | (2018.01) | |
| A01G 9/08 | (2006.01) | |
| A01G 9/14 | (2006.01) | |
| A01G 9/029 | (2018.01) | |

(52) U.S. Cl.
CPC ............. *A01G 9/088* (2013.01); *A01G 9/143* (2013.01); *A01G 9/0295* (2018.02); *Y02A 40/252* (2018.01)

(58) Field of Classification Search
CPC .......... A01G 9/104; A01G 9/02; A01G 1/007; A01G 9/10; A01G 9/028; A01G 9/027; A01G 9/088; A01G 9/108; A01C 11/025
USPC ................................ 47/65.9, 66.5, 86, 73, 77
See application file for complete search history.

(56) References Cited

U.S. PATENT DOCUMENTS

| | | | | |
|---|---|---|---|---|
| 3,397,504 A | * | 8/1968 | Drennan ................... 53/448 |
| 3,771,258 A | * | 11/1973 | Charney .................... 47/65 |
| 3,913,758 A | * | 10/1975 | Faircloth et al. ............. 414/373 |
| 4,028,847 A | * | 6/1977 | Davis et al. ................... 47/65 |
| 4,251,951 A | * | 2/1981 | Heinstedt ....................... 47/39 |
| 4,312,152 A | * | 1/1982 | Drury et al. ................... 47/63 |
| 4,505,068 A | * | 3/1985 | Kaneko .................... 47/59 R |
| 4,932,158 A | * | 6/1990 | Roberts ........................ 47/65 |
| 5,035,105 A | * | 7/1991 | Qvarnstrom .................. 53/448 |
| 5,225,345 A | * | 7/1993 | Suzuki et al. ............. 435/283.1 |
| 5,303,505 A | * | 4/1994 | Sumiyoshi et al. .............. 47/65 |
| 5,323,567 A | * | 6/1994 | Nakayama et al. ............... 47/65 |
| 5,595,020 A | * | 1/1997 | Ito ............................ A01G 9/104 47/66.5 |
| 5,979,111 A | * | 11/1999 | Brown et al. ................. 47/59 R |
| 6,029,399 A | * | 2/2000 | Mercer .......................... 47/66.5 |

(Continued)

FOREIGN PATENT DOCUMENTS

| | | |
|---|---|---|
| BE | 832334 A1 | 12/1975 |
| NL | 8 502 774 | 5/1987 |
| NL | 8502774 A | 5/1987 |

OTHER PUBLICATIONS

International Search Report corresponding to International Application No. PCT/EP2011/04696, dated Feb. 6, 2012; 8 total pages, including translation.

(Continued)

*Primary Examiner* — Marc Burgess
(74) *Attorney, Agent, or Firm* — Carter, DeLuca, Farrell & Schmidt, LLP

(57) ABSTRACT

The present invention relates to an apparatus for breeding plants having at least two units arranged in the apparatus for the reception of a plant, wherein at least two units are arranged in a first row and at least one of these units is movable relative to at least one further unit of the first row so that their spacing from one another is changeable.

26 Claims, 16 Drawing Sheets

(56) References Cited

U.S. PATENT DOCUMENTS

| | | | | |
|---|---|---|---|---|
| 6,085,460 | A * | 7/2000 | Jackson | 47/65.5 |
| 6,164,537 | A * | 12/2000 | Mariani et al. | 235/383 |
| 6,415,549 | B1 * | 7/2002 | Beeson, Jr. | A01G 9/104 47/39 |
| 6,644,484 | B1 * | 11/2003 | Sardis | A47B 43/00 211/189 |
| 6,840,007 | B2 * | 1/2005 | Leduc et al. | 47/62 C |
| 7,735,259 | B2 * | 6/2010 | Rich | A01G 9/122 47/44 |
| 7,735,647 | B2 * | 6/2010 | Raker et al. | 206/423 |
| 8,359,787 | B2 * | 1/2013 | Visser | 47/18 |
| 8,627,599 | B2 * | 1/2014 | Contillo et al. | 47/87 |
| 2002/0035803 | A1 * | 3/2002 | Dummen | 47/73 |
| 2004/0216696 | A1 * | 11/2004 | Haring | A01K 15/027 119/784 |
| 2008/0066378 | A1 * | 3/2008 | Terasawa | A01G 9/104 47/66.5 |
| 2008/0086944 | A1 * | 4/2008 | Ribeiro De Matos | A01G 9/088 47/82 |
| 2008/0302008 | A1 * | 12/2008 | Jung | A01G 9/027 47/79 |
| 2009/0277086 | A1 * | 11/2009 | Hazan | A01G 9/023 47/83 |
| 2010/0018473 | A1 * | 1/2010 | Brown | A01K 1/04 119/784 |
| 2011/0084088 | A1 * | 4/2011 | Scribner | A01G 9/022 220/751 |
| 2012/0186154 | A1 * | 7/2012 | Guerche et al. | 47/65 |
| 2015/0135592 | A1 * | 5/2015 | Lin | A01G 9/104 47/86 |
| 2016/0360710 | A1 * | 12/2016 | Merzweiler | A01G 9/028 |

OTHER PUBLICATIONS

English translation of the Written Opinion of the International Searching Authority, dated Mar. 23, 2013; 5 pages.
English translation of the International Report on Patentability (Chapter I), dated Mar. 26, 2013; 6 pages.
Australian Patent Examination Report No. 1, dated Jan. 31, 2015, corresponding to Australian Patent Application No. 2011304733; 3 pages.

* cited by examiner

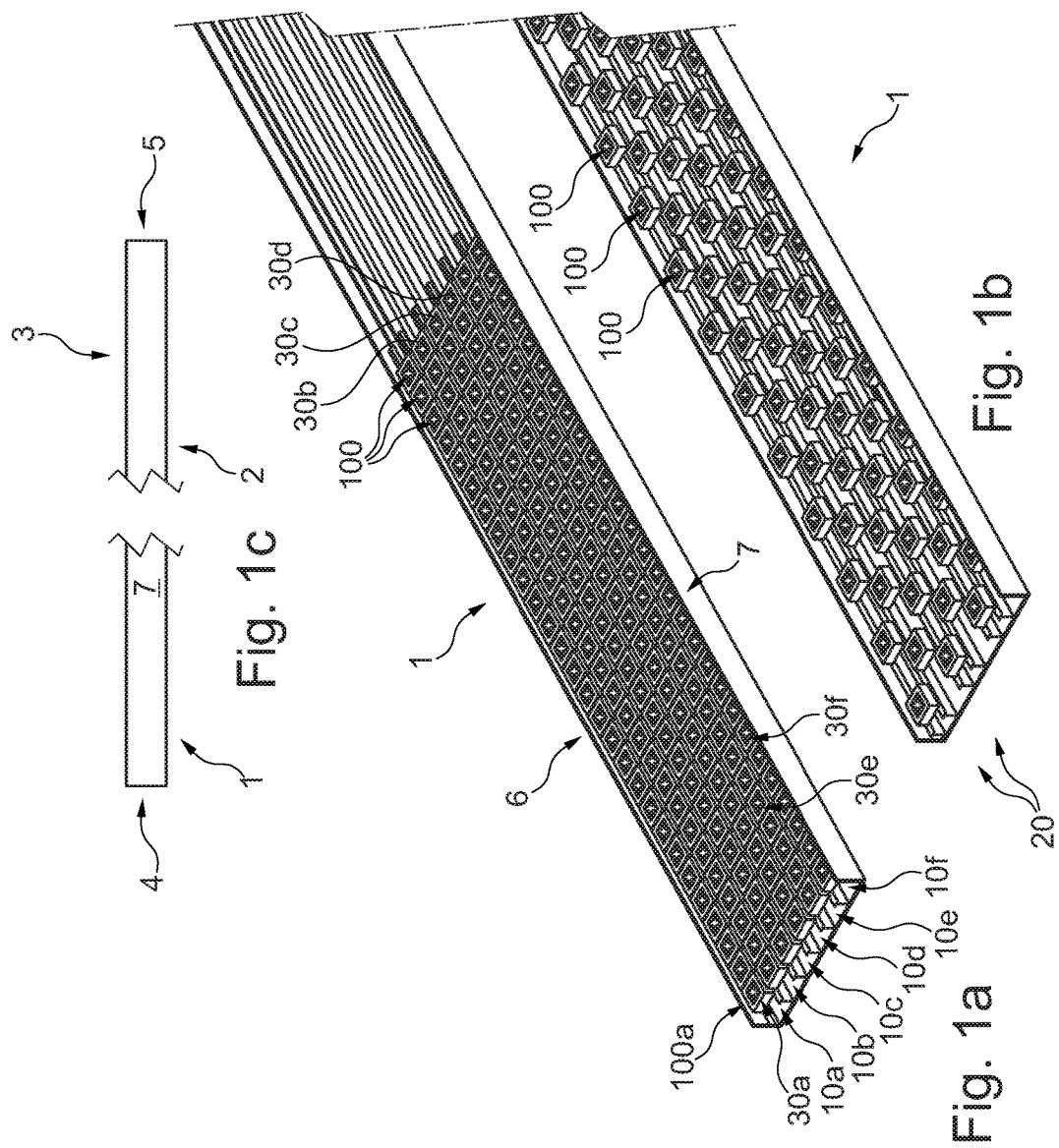

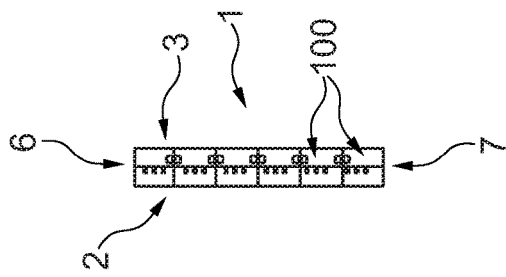
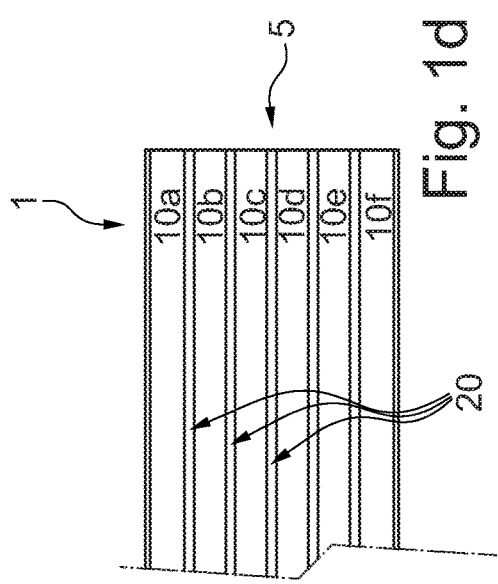
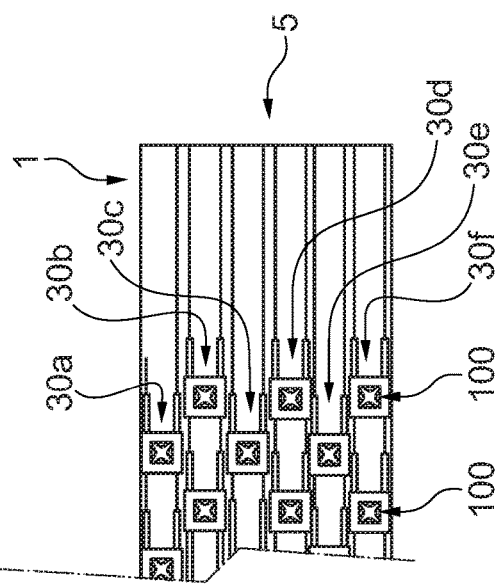
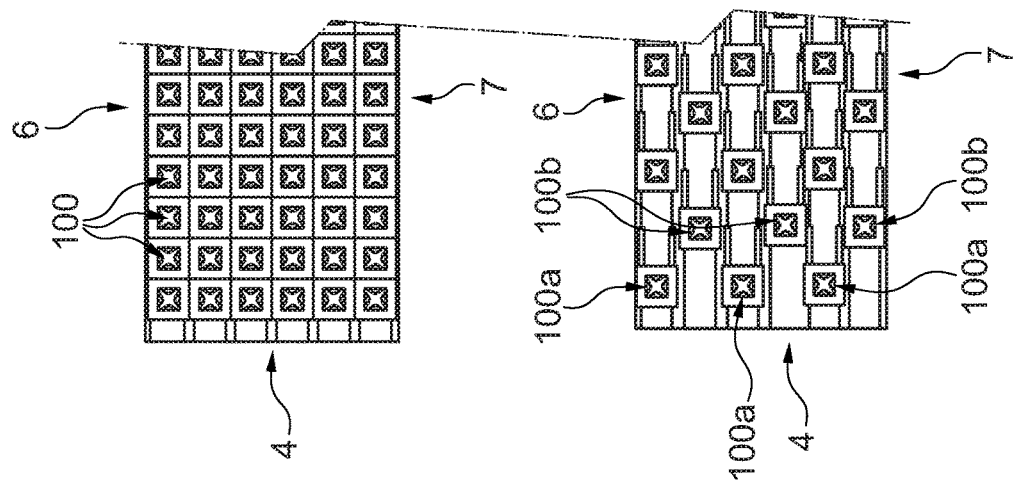

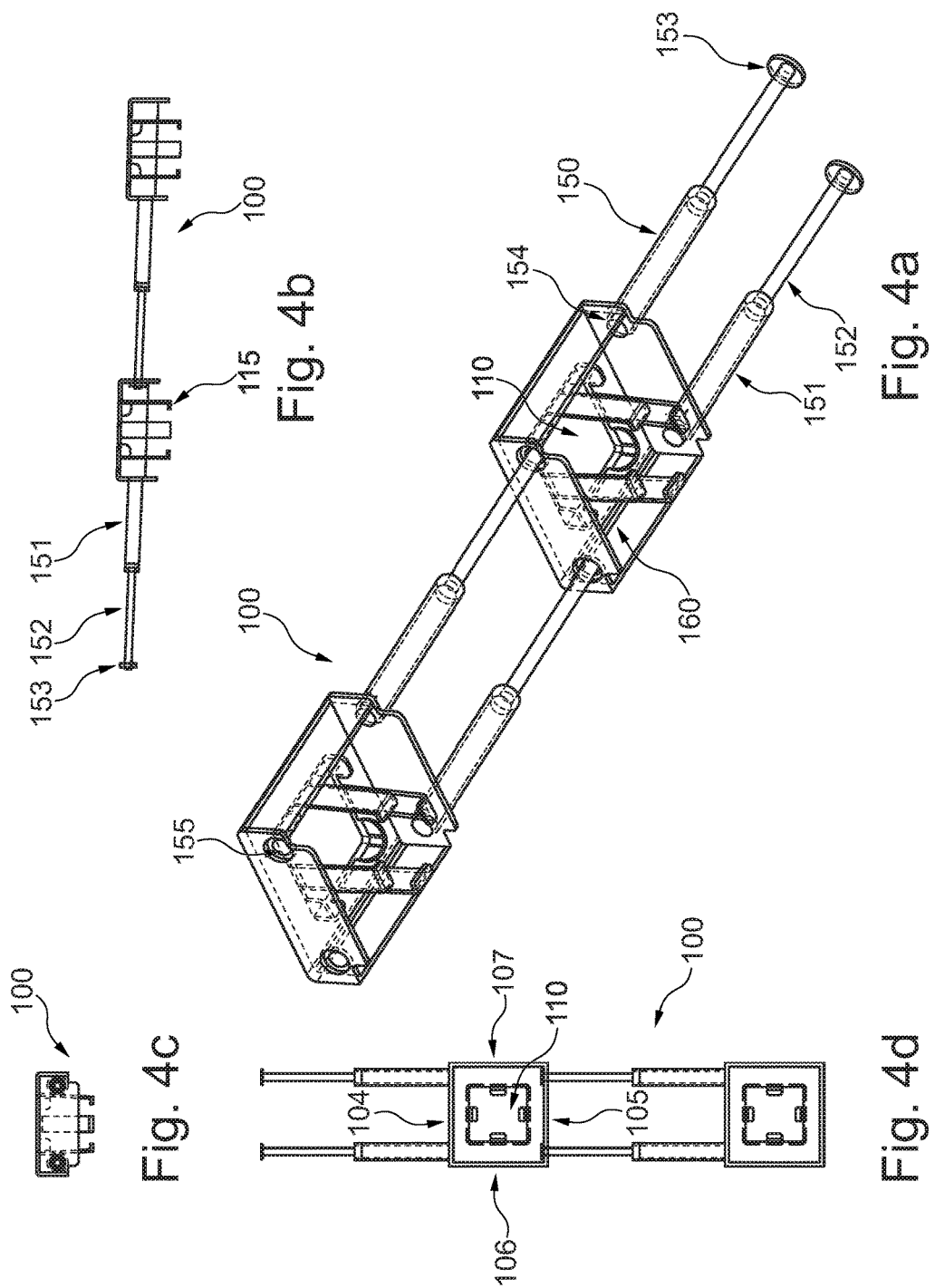

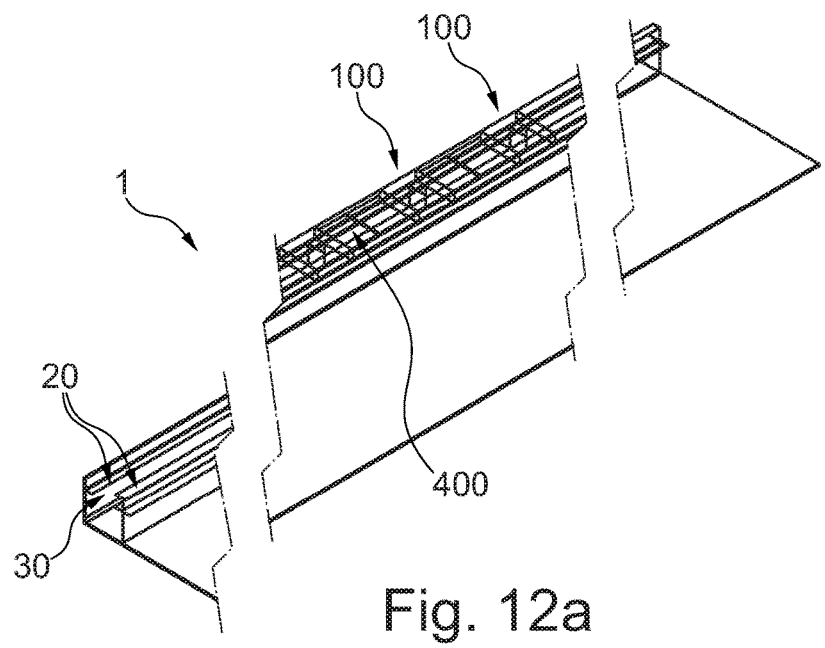
Fig. 12a
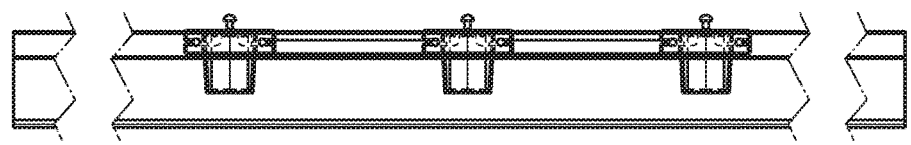
Fig. 12b
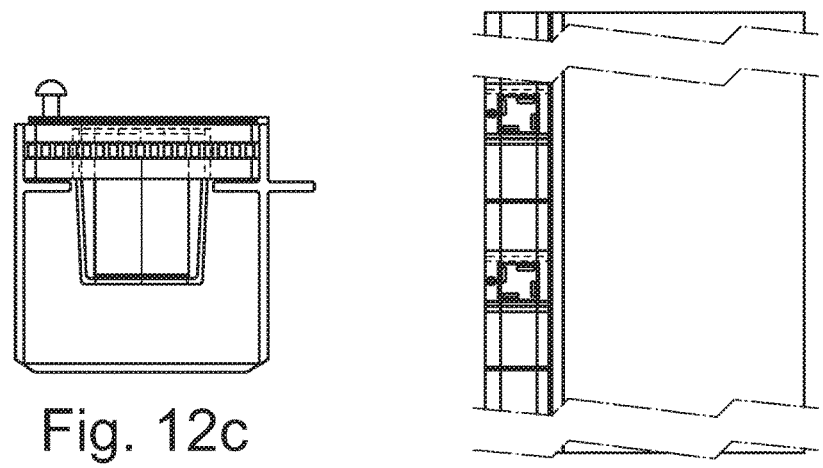
Fig. 12c
Fig. 12d

APPARATUS FOR BREEDING PLANTS

The invention relates to an apparatus for breeding plants.

Apparatus for the commercial breeding of plants are known from the prior art. In known breeding plants of this type, it is often felt to be disadvantageous that the increasing space requirements of the plants resulting from the growth of the plants has to be taken into account in advance on the planting or that the plants have to be repotted later. A large-scale harvesting and watering is likewise associated with an increased effort. The problem furthermore often results in plant cultures of the transmission of pests or bacteria from one plant to the next, which can be caused by a small distance of the plants from one another.

It is a goal of the present invention to provide an apparatus for breeding plants improved under these aspects.

This goal is achieved by an apparatus in accordance with claim 1. Advantageous embodiments result from the dependent claims.

The invention is accordingly directed to an apparatus for breeding plants having at least two units arranged in the apparatus for the reception of a plant. In accordance with the invention, these two units are arranged in a first row, wherein at least one of these two rows is movable relative to at least one further unit of the first row and/or to the remaining parts of the apparatus so that the distance of this movable unit from at least one other unit of the first row is changeable.

The apparatus in accordance with the invention can be used for breeding decorative plants or crop plants. Preferred examples include decorative plants such as tulips and/or crop plants such as lettuces.

In an embodiment, the apparatus has at least two further units arranged in the apparatus for the reception of a plant which are arranged in a second row, wherein at least one of these further units is movable relative to at least one unit of the second row and/or to the remaining parts of the apparatus so that the distance of this movable unit from at least another unit of the second row is changeable. Adjacent units within the second row cannot have any larger distance than a defined maximum distance from one another.

In a further embodiment, an apparatus in accordance with the invention has n further rows, where n is a whole number $\geq 1$. Preferred values for n include $n \geq 3$, $n \geq 4$ or $\geq 5$. All the rows of this embodiment preferably include at least two units arranged in the respective row for the reception of a plant, wherein at least one of these two units is movable relative to one or more further units of the respective row and/or to the remaining part of the apparatus so that its distance from at least one other unit of the respective row is changeable.

In an embodiment, a row of an apparatus in accordance with the invention has at least m units, where at least m−1 of these units are movable relative to further units of the respective row or to the apparatus so that the distance of the m−1 or of all movable units relative to all remaining units of the row is changeable. m is in this respect a whole number $\geq 2$. Preferred values for m include $m \geq 3$, $m \geq 5$ or $m \geq 10$.

In an embodiment, adjacent units within one row, a plurality of, or all the rows cannot have a larger distance than a defined maximum distance from one another.

In an embodiment, all the rows are identical.

In an embodiment, all the rows of an apparatus in accordance with the invention have an identical number of units. In an embodiment, all the rows of an apparatus in accordance with the invention have a different number of units. In an embodiment, in parallel rows, each second row has an identical number of units.

In an embodiment, a specific number of rows, preferably half the number of rows, have an identical number of units. The remaining rows can likewise have a mutually identical number of units.

In another embodiment, individual rows can differ in one or more of the features described in the course of the following discussion of different embodiments. In an embodiment, for instance, a specific number of rows, preferably half the number of rows, is identical. The remaining rows can naturally likewise be identical to one another.

In an embodiment, the movable units of one row or of each row are displaceable in a preferably horizontal plane of the apparatus along a straight line or a curved line. A straight line is generally preferred as a rule. If the apparatus should, however, preferably be of a curved shape for technical arrangement reasons, movements are also expedient along a curved line in a preferably horizontal plane. The movement should in this respect generally have one degree of freedom, that is, only take place in one direction. The possible movement of the units can be strictly restricted to this one degree of freedom, for example by movement in a guide. It is, however, also conceivable that the movement extends substantially along a line, but has preferably small leeway, for example less than 5 cm and preferably less than 1 cm, in the direction normal to the line.

In an embodiment, the lines of a possibly present plurality of rows are parallel, said lines defining the direction of movement of the units in the addressed plane of the apparatus In an embodiment, with at least sectionally parallel rows, each second row is identical.

In an embodiment, the or all the movable units of a row are arranged along a common straight or curved linear bearing. In this connection, common means that the or all the units of a row are arranged at the same linear bearing. It is in this respect preferably a sliding guide having one rail and preferably having two rails. A linear bearing is used for guiding a straight-line movement between two bodies. The degree of freedom is one. In addition to a sliding guide, which represents the simplest and most frequent kind of linear bearing, linear rolling guides and the like are also expedient.

In an embodiment, the apparatus in accordance with the invention has, at least section-wise, a plurality of guides disposed next to one another and in parallel.

in an embodiment, a single component represents the guides of two adjacent rows at least section-wise. The term "at least section wise" is directed here and in any other connection within this application to sections along the direction of movement of the units.

In an embodiment, the apparatus has at least two mutually adjacent sections along the extent of the rows, wherein at least two rows and preferably all rows extend parallel to one another in the first section and wherein the spacing of at least two rows from one another in the second section changes, preferably increases, and further preferably doubles. In this respect, the number of rows can be reduced, preferably half, on the transition from the first section to the second section. Provision can be made in this connection that a portion of the rows, preferably half the rows, which the apparatus has in the first section, ends on the transition from the first section to the second section. The remaining portion of the rows, preferably the remaining half of the rows, can continue in the second section, wherein the extent of these rows (in the sense of the direction of the rows) changes in the second section for the purpose of changing the spacing in comparison with the extent of these rows in the first section.

In this connection, the remaining rows in the second section do not extend parallel to one another in an embodiment, but rather spread apart from one another. In a further embodiment, a parallel extent of the remaining rows is provided in the second section, wherein this extent is however, oblique to the extent of the same rows in the first section.

In a further embodiment, the apparatus has at least three mutually adjacent sections along the extent of the rows, wherein the third section has a number of rows which preferably extend parallel to one another and which is reduced, preferably halved, in comparison with the first section. Provision can thus be made that a plurality of rows in the third section again extend parallel to one another, but have a larger spacing from one another than the rows in the first section. Since the third section has fewer rows than the first section, in an embodiment, the width of the apparatus can be constant despite the increased spacing of the rows from one another in the first and second and/or third sections.

In an embodiment, the apparatus can originally only have a first section and can be expandable by the second and third sections.

This embodiment can be advantageous to adjust the apparatus better to the increasing space requirements of a plant with continuous growth. When the plants have reached a specific size, for example the units of every second row of the first section can thus be pulled into the third section so that every single plant has more space both in the first section (by emptying half the rows and in the third section (due to the greater spacing of the rows from one another).

In an embodiment, a first position and/or a second position and/or a third position of at least two units, preferably a plurality of units, and particularly preferably all the units, can be determined or defined and/or changed within one row, a plurality of, or all the rows. The term starting position can also be used as a synonym for the first position which the units can adopt in a first state of the apparatus. In the first position, adjacent units are disposed closer to one another within a row than in the second position. The third position is to be understood as a configuration in which a portion of the units of the apparatus is located in the third section.

In an embodiment, a first and/or a second position and/or a third position of one unit, or a plurality of units is defined, preferably in a guide or at another point of the apparatus, by a fixing means such as a stopper or an end point, wherein this guide can be the linear bearing discussed in connection with the embodiments described above or a further separate guide. This guide can be connected directly or indirectly to one unit or to a plurality of units, for example by a bar.

In an embodiment, adjacent units can optionally also contact one another in the first position within a row. This allows a good utilization of space within the apparatus on the planting and in the first growth phase of the plants. Contact is to be understood such that the units touch one another. If the units have an rectangular or square base surface, contact can, however, mean that adjacent units each share a mutually touching edge.

In an embodiment, all the units belonging to a row are movable relative to the apparatus.

In another embodiment, a single unit of a row is not movable relative to the apparatus and all the remaining units of this row are movable relative to the apparatus. The unit not movable relative to the apparatus is preferably a terminal unit of the respective row having only one adjacent unit within the same row. In this case, the remaining units of the row can be splayed out from the fixed unit in one direction. It can, however, also be a unit of the respective row arranged centrally in the row having two adjacent units within the same row. In this case, the remaining units of the row can be splayed out to this side and that side of the fixed unit in opposite directions.

In an embodiment, in a specific number of rows, preferably half the number of rows, a single unit of the row is not movable relative to the apparatus and all the remaining units of the row are movable relative to the apparatus. In the remaining rows, all the units belonging to the row can be movable relative to the apparatus.

In an embodiment, in parallel rows, a single unit of the row at each second row is not movable relative to the apparatus and all the remaining units of the row are movable relative to the apparatus. At the rows disposed therebetween, all the units belonging to the row are movable relative to the apparatus.

The apparatus preferably includes two or more than two rows of units which preferably extend parallel to one another at least section-wise.

It is conceivable that the units of at least two adjacent rows are not disposed next to one another in the drawn apart state, i.e. in the second position, even if such an embodiment is covered by the invention, but are rather offset to one another. A maximum offset results when the unit of a row is arranged between two units of the adjacent row or of both rows disposed behind one another so that the spacing of the unit of the one row from the two units of the adjacent row(s) disposed behind one another is identical. An offset differing therefrom is, however, also conceivable, for instance such that the unit of one row from one of two units of the adjacent row(s) disposed behind one another is greater than from the other.

In an embodiment, the second position of at least two units, preferably a plurality of, and particularly preferably all the units of at least two adjacent rows, preferably a plurality of, and particularly preferably all the rows, can be defined or definable such that the units of two adjacent rows are offset along the direction of movement. A preferred offset includes half a defined maximum spacing from one another of two units within a row.

A maximum spacing of units of adjacent rows and a uniform distribution of the units over the apparatus result, for example, from such an offset. The space utilization is thus optimum in that individual units have a tot of space measured against the size of the apparatus and have a large distance from one another. The transmission of pests, fungi or bacteria from one plant to the next is made more difficult.

In an embodiment, the third position of at least two units, preferably of a plurality of, and particularly preferably all units of at least two adjacent rows, preferably a plurality of, and particularly preferably all rows can be defined or definable so that of the units of two adjacent rows the units of a row are located in the first section and the units of the other row are located in the third section. There thereby results, as already stated in detail above, a further enlargement of the spacing between the units within the apparatus in comparison with the second position, whereby sufficient space can be available to the plants grown in the apparatus in advanced stages of the breeding.

The units for the reception of a plant are preferably arranged horizontal in the apparatus and can accept any desired shape in outline. A rectangular outline or a square outline are preferred. An opening or a reception region for the plants or a container surrounding the plant and the substrate can be present at the center, wherein this opening or this reception region optionally do not have any base within the unit and pass through it from the top to the bottom.

The magnitude of the offset can be preset by means which prevent the further movement of the units such as, for example, by blocks or the like or also by the length of connection elements which connect two elements of a row disposed behind one another.

In an embodiment, the units for the reception of a plant can have a recess for the reception of a plant together with the substrate or a holder located in a recess or made as a recess for a plant container, in particular for a flowerpot.

In an embodiment, the units for the reception of a plant can have a holder optionally located in a recess or made as a recess for the plant or for the roots of the plant without a substrate or without a container surrounding the plant and substrate.

In an embodiment, an apparatus in accordance with the invention has a reception region for a substrate and/or a culture medium beneath the units for the reception of a plant of a row, a plurality or rows or all the rows. The reception region or the substrate or culture medium present therein can be shared by the plants of different units of a row. It is also conceivable that the substrate or culture medium is shared by units of a plurality or all of the rows. The culture medium can optionally be water enriched with nutrients.

A preferred cultivation type of plants while using an apparatus in accordance with the invention in this embodiment is a hydroculture. The roots there can be displaced on the movement of a unit or increased effort or any potential damage to the plant on the movement of a unit in a culture medium.

In an embodiment, the units are arranged floating on a culture medium or substrate.

In another embodiment, such a reception region is omitted.

A separate culture medium and/or substrate for the units of a row or for every individual unit can have the advantage that bacteria or fungi at the roots of the plants do not propagate from one row or unit into the next.

In an embodiment, the apparatus has a cover between adjacent units of a row. Alternatively, a cover can be insertable between adjacent units of a row. The cover overlies the intermediate space between the units when they are spaced apart from one another. This has the purpose that, after the puffing apart of the rows, the substrate or the culture medium beneath the plane of the units is covered and thus protected from influences from the outside. The cover can either be fixedly connected to both units or the units can have a receiver at which the cover can be fastened. The cover is preferably elastic and of palmar form or rigid and of plate shape and can be foldable and/or telescopic for adapting its surface to the changeable spacing between adjacent units.

In an embodiment, an apparatus in accordance with the invention has a spring means between at least two units, preferably a plurality of and particularly preferably all the adjacent units within one row, a plurality of, or all the rows, said spring means pushing adjacent units away from one another. This pushing away can facilitate the reaching of a defined maximum spacing. Suitable spring means include a steel spring, for example.

In an embodiment, the apparatus has at least one releasable blocking mechanism which can keep the spacing between at least two adjacent units, preferably a plurality of, and particularly all the adjacent units within one row, a plurality of, or all the rows smaller than a defined maximum spacing. Suitable blocking means include a blocking element at the rails or an obstacle in the defined direction of movement of the units.

In an embodiment, the apparatus has an actuation means with which the spacing of at least two units, preferably a plurality of, and particularly preferably all the units within one, a plurality of or all the rows can be changed simultaneously or successively. Suitable actuation means include handles directly or indirectly connected, for example connected indirectly via a cord or bar to terminal units of one row, a plurality of or all the rows or include a means for releasing a blocking mechanism described in connection with the preceding embodiment. A mechanical or electric control unit is also suitable to change the spacing.

It is conceivable that the units of a plurality of rows or of all the rows are moved in the desired position by a single actuation device.

In an embodiment, all or a plurality of adjacent units are connected within a row of the apparatus in accordance with the invention. The means for connecting adjacent units within a row are in this respect made so that the distance of the units can be changed despite the connection. Suitable means include a string, a cord, a wire, foldable and rigid members connected to one another by axles (similar to a yardstick), a rod which can be moved out telescopically or a simple rod which is displaceably received at least one of the connected units.

In an embodiment, two units are connected by a connection means. In another embodiment, two units are connected by two means for connecting adjacent units.

In an embodiment, a first position and/or a second position of the units is/are defined by the connection means.

In an embodiment, a maximum distance of two adjacent units of a row is preferably reversibly settable at the means for connecting these units. In this respect, the single or multiple means for connecting adjacent units, or if a plurality of means connect two adjacent units, at least one of the two means can be a longitudinally displaceable element. With members connected to one another by axles and which are foldable and rigid, a maximum angle can, for example, be set between individual members. With a telescopic rod, the maximum length can be set by bounding the moving out capability. With a simple rod, the position of a stopper can be changed which determines how far the rod can be moved out of a reception region of a unit.

In an embodiment, a connection means, a pair of connection means or a plurality of connection means are connected permanently and/or fixedly and/or integrally to one unit, two adjacent units or a plurality of units.

In an embodiment, the units have a receiving region for the means for connecting adjacent units which is optionally formed by a prolongation projecting vertically from the units. The means for connection can be releasably fastened to this receiving region.

In an embodiment, the means for connecting two adjacent units of a row can be received at least in part in at least one or two units. In other words, a unit includes a reception region for the connection means. In the case of use of an optionally telescopic rod as means for connecting two adjacent units, this means can be received in a recess in one or both adjacent units if they have less than the maximum distance from one another. The reception regions for the connection means are preferably arranged so that this does not overlap an optionally present recess for the reception of the plant in the units.

In an embodiment, all the means for connecting in adjacent units of a row are identical within the row. In an embodiment, all the means for connecting two adjacent units are identical in the total apparatus.

In an embodiment, the apparatus has an actuating mechanism with which the position of all units within at least one row, or also the position of all units within a plurality of rows, can be changed and determined. Provision can thus be made, for example, that the units within a row can be moved with the help of the actuating mechanism from a state in which adjacent units contact one another into a state in which adjacent units adopt the maximum spacing from one another. Provision can furthermore be made, for example, that the units of the apparatus can be moved with the help of the actuating mechanism from a first position (as defined above) into a second position (as defined above) and into a third position (as defined above). The actuating mechanism can be mechanical or electrical. An example includes a roller on which a cord acting as a connection means can be wound and which can be controlled by means of a manually or electrically actuable crank.

Further details and advantages of the invention result from the embodiments described in connection with the Figures. There are shown in the Figures:

FIG. 1: an embodiment of an apparatus in accordance with the invention;

FIG. 2: a further embodiment of an apparatus in accordance with the invention;

FIG. 3: a detailed view of an embodiment of two units of a row of an apparatus in accordance with the invention in a first position to one another;

FIG. 4: the units shown in FIG. 3 in a second position to one another;

FIG. 5: a detailed view of a further embodiment of two units of a row of an apparatus in accordance with the invention;

FIG. 6: a detailed view of a further embodiment of two units of a row of an apparatus in accordance with the invention;

FIG. 7: a further embodiment of a unit of an apparatus in accordance with the invention;

FIG. 8: two units shown in FIG. 7 which are arranged within a row and are connected by a cord;

FIG. 9: an actuating mechanism by which the position of a plurality of units within a row can be changed;

FIG. 10: three mutually spaced apart units of a row of an apparatus in accordance with the invention, with the intermediate space being covered by a cover between adjacent units;

FIG. 11: a detailed view of the cover shown in FIG. 10;

FIG. 12: the units shown in FIG. 10, received in the guide of a row;

FIG. 13: an embodiment of the apparatus in accordance with the invention, with the apparatus being divided into three sections; and FIG. 14: a further embodiment of the apparatus in accordance with the invention, with the apparatus being divided into three sections.

FIG. 1 shows an embodiment of an apparatus 1 in accordance with the invention.

FIG. 1a shows a perspective view of this embodiment, wherein the units 100 of the apparatus 1 are in a first position to one another. FIG. 1b shows a perspective view of this embodiment, wherein the units 100 of the apparatus 1 are in a second position to one another. FIG. 1c shows a side view of this embodiment. FIG. 1d shows a plan view of this embodiment, wherein the units 100 of the apparatus 1 are in a first position to one another. FIG. 1e shows a plan view of this embodiment, wherein the units 100 of the apparatus 1 are in a second position to one another. FIG. 1f shows a front view of this embodiment. FIG. 1g shows a side view of a portion of a rail 20 schematically illustrating a common bearing 20a.

The apparatus 1 has a lower side 2, an upper side 3, a front side 4, a rear side 5, a left side 6 and a right side 7. The apparatus is elongate and flat in the form of a board. In this respect, the height, that is the distance from the lower side 2 to the upper side 3 in relation to the width, that is in relation to the distance from the left side 6 to the right side 7, is small. The width is in turn small in relation to the length, that is to the distance between the front side 4 and the rear side 5.

The apparatus has a plurality of regions or reception regions 10a, 10b, 10c, 10d, 10e and 10f for a substrate, liquid culture medium or water, which are separated from one another by guide rails 20. These regions can also be empty and only serve as a free space to ensure an undisturbed movement of the units along the guide rails.

A plurality of rows 30a, 30b, 30c, 30d, 30e and 30f of units 100 for the reception of plants are applied extending in parallel between the guide rails 20 and above the reception regions 10. They are displaceable along the longitudinal axis of the apparatus 1, that is in the direction from the front side 4 to the rear side 5 and conversely of the apparatus 1 at the rails 20.

In FIGS. 1a and 1d, the units 100 of the rows 30 are arranged in a first, compact state. In this respect, the units 100 of a row 30 share a common side edge. In this state, seedlings or seeds can be planted in a compact section of the apparatus 1. The planting is facilitated in that the individual planting positions are disposed close to one another. Furthermore, the use of a culture medium or of a substrate can be restricted to these sections of the reception regions or of the apparatus at which plants are actually present. Alternatively, only one small region has to be watered. The region of the apparatus at the right in the Figures in which no units 100 are present is not in use in this first state of the apparatus.

In FIGS. 1b and 1e, the units 100 of the rows 30 are arranged in a second, open state. In this respect, the units 100 within each row 30 are each pushed apart so much that they have the defined maximum distance from one another.

In the rows 30a, 30c and 30e, in this respect, the position of the first unit 100a of the row is unchanged in relation to the first state shown in FIGS. 1a and 1d. It is conceivable that these units 100a are fixedly fastened to the apparatus 1 or to the rails 20. In the rows 30b, 30d and 30f, the first unit 100b is displaced in each case in relation to the first state shown in FIGS. 1a and 1d by half the maximum distance from the starting position between the units of a row. In this respect, it is, however, only an example. A different offset is naturally also possible.

It is also possible that the offset of row to row is not identical, but rather varies, provided that this is desired.

In these rows, all the units 100 are thus displaceably arranged in the longitudinal direction. The units of adjacent rows are thus arranged offset by half the maximum distance, for example, in the second state, wherein a maximum distance also results between the units of different rows. In this embodiment, the units 100 for the planting of the plants and thus also the plants are now distributed at a maximum distance uniformly over the apparatus. The space utilization is thus optimum in that individual plants have the maximum room available measured against the size of the apparatus and have the maximum distance from one another. Optionally, the portion of a plant at a common substrate or at a common liquid fertilizer is maximum measured against the total size of the apparatus. The transmission of pests, fungi or bacteria from one plant to the next is anyway made difficult by the large distance of the plants from one another.

The apparatus can be moved from the first state into the second state by a simple displacement of the units 100 along the guide rails 20, for example by pulling at the rear ends of the rows 30 shown at the right in FIG. 1. In the case of a common culture medium or substrate, this procedure is particularly simple on the use of a hydroculture since the loose roots only have to be displaced in the fluid culture medium. This procedure is likewise very simple in the case of separate culture media, i.e. a separate container per unit.

FIG. 2 shows a perspective view of a further embodiment in an apparatus 1 in accordance with the invention. This is similar to the embodiment shown in FIG. 1, but the regions 10, rails 20, rows 30 as well as the left and right side edges of the apparatus are now not straight, but curved. The units 100 are thus displaced along the apparatus at curved tracks 20, which are parallel to one another, however, wherein the displacement takes place in the horizontal plane of the apparatus.

FIG. 3 shows a detailed view of two adjacent units 100 of a row 30 of an apparatus 1 in accordance with the invention. The detailed view is taken from an apparatus 1 in the first state shown in FIGS. 1a and 1d, wherein these units are in mutual contact along a side edge.

FIG. 3a shows a perspective view of these two units. FIG. 3b shows a side view of these two units. FIG. 3c shows a front view of these two units. FIG. 3d shows a plan view of these two units.

The units 100 have a lower side 103, an upper side 102, a front side 104, a rear side 105, a left side 106 and a right side 107. The units are square in outline, that is the left and right side edges and the front and rear side edges are each of equal length. The units 100 are flat, wherein the height, that is the distance between the lower side 103 and the upper side 102, is smaller than the side or longitudinal edges.

A reception region 110 for a plant or for a container accommodating a plant is located at the center of the units (seen from above). It is thus conceivable that a flowerpot with a substrate is received in the reception unit. A holder 115 for the plant or for a container accommodating a plant is attached in the reception regions. The holder 115 projects beyond the lower side 103 of the units.

The units 100 are connected to means 150 for connecting the units. These means 150 are telescopic bars which are in the moved in state. Two such means 150 for connecting adjacent units connect the two units 100 shown to one another.

The units 100 furthermore have reception regions 160 for the telescopic bars in which the connection means 150 can be received. As can be clearly recognized in FIG. 3d, these reception regions 160 are each attached to the left and the right of the reception region 110 for the plant or for a container accommodating the plant.

FIG. 4 shows a detailed view of the same two adjacent units 100 as FIG. 3. The detailed view is taken from an apparatus 1 in the second state shown in FIGS. 1b and 1e, wherein the units are arranged spaced apart from one another.

FIG. 4a shows a perspective view of these two units. FIG. 4b shows a side view of these two units. FIG. 4c shows a front view of these two units. FIG. 4d shows a plan view of these two units.

Reference is also made to the description of the Figures of FIG. 3 with respect to a detailed description of the individual units.

The means 150, i.e. the telescopic bars for connecting individual units 100, are now moved out of the reception regions 160 within the units 100.

It can easily be recognized that the connection means 150 is permanently and immovably connected to one of the two adjacent units at the end 154. The complete release from the reception regions 160 of an adjacent unit 100 or from the adjacent unit 100 per se is prevented at the oppositely disposed side of the connection means 150 by stoppers 153 which are shown in the form of plate-like end pieces in FIG. 4. The telescopic rods have two part sections 151 and 152. The maximum distance between the units 110 is defined either by the position of the stopper at part section 152 or by the maximum stroke of the telescopic moving out.

When the units are moved apart, so that the apparatus 1 moves from the first state shown in FIGS. 1a and 1d into the second state shown in FIGS. 1b and 1e, the telescopic moving apart is initially suppressed and the total connection means 150 is pulled out of the reception region 160 of the adjacent unit. If the total connection means 150 is pulled out, the stopper 153 contacts the frame at the rear side 105 of the adjacent unit. The telescopic moving apart now starts until the maximum distance between the units is reached.

FIG. 5 shows a detailed view of a further embodiment of two adjacent units 100 of a row 30 of an apparatus 1 in accordance with the invention in the second state.

FIG. 5a shows a side view of these two units. FIG. 5b shows a front view of these two units. FIG. 5c shows a plan view of these two units.

The structure of the individual units 100 is similar to the structure of the units described in connection with FIG. 3. Reference is also made to the description of the Figures of FIG. 3 with respect to a detailed description of the individual units.

Deviating from the embodiments of two adjacent units shown in FIGS. 3 and 4, the units shown in FIG. 5 are connected to one another by such a connection means 150 which is, composed of a plurality of foldable rigid members 156 pivotably connected to one another at axles 157. Only one such connection means 150 is present, between two adjacent units 100. The terminal members 155 are pivotably connected to the two adjacent units 100 at axles 158.

The units 100 have reception regions 161 for the connection means 150 which, as can be recognized particularly easily in FIG. 5c, are arranged in the unit 100 before and after the reception region 110 for a plant or for a container accommodating a plant.

If the apparatus 1 is in the first state shown in FIGS. 1a and 1d, wherein the units 100 contact one another along the front edge or rear edge, the members 156 of the connection means 150 are folded together and are received in the reception regions 161.

When the units are moved apart so that the apparatus 1 changes from the first state shown in FIGS. 1a and 1d into the second state shown in FIGS. 1b and 1e, the members 156 are pulled apart, wherein they are pivoted at the axles 157. The maximum distance between two units 100 can be defined by the sum of the lengths of all members 156 of the connection means 150. However, the definition of a shorter maximum spacing is also possible by the setting of a maximum angle $\alpha$ between the members.

FIG. 6 shows a detailed view of a further embodiment of two adjacent units 100 of a row 30 of an apparatus 1 in accordance with the invention in the second state.

FIG. 6a shows a perspective view of these two units. FIG. 6b shows a side view of these two units. FIG. 6c shows a front view of these two units. FIG. 6d shows a plan view of these two units.

The structure of the individual units 100 is similar to the structure of the units described in connection with FIG. 3. Reference is also made to the description of the Figures of FIG. 3 with respect to a detailed description of the individual units.

Two respective means 150 are provided between the units for connecting the units in the form of a string 159 which is connected to the units at points 159a. The string can be a simple cord, a wire or a strand divided into members and having predefined kink points.

If the apparatus 1 is in the first state shown in FIGS. 1a and 1d, wherein the units 100 contact one another along the front edge and rear edge, the string 159 hangs loosely between the units 100. A reception region 160 is not present since the string 159 in the first state does not have to be lowered in a unit to allow a contact of the units.

When the units are moved apart so that the apparatus 1 changes from the first state shown in FIGS. 1a and 1d into the second state shown in FIGS. 1b and 1e, the string 159 is tensioned. The maximum distance is defined by the length of the string 159.

FIG. 7 shows a further embodiment of a unit 100 of an apparatus in accordance with the invention. FIG. 7a shows a perspective view, FIG. 7b a side view, FIG. 7c a frontal view, and FIG. 7d a plan view of this unit.

The structure of the unit 100 is similar to the structure of the units described in connection with FIGS. 3 to 6, whereby reference is generally made to the description there.

Differing from the units shown in FIGS. 3 to 6 for use in an apparatus in accordance with the invention, the unit 100 in this embodiment has a mushroom-shaped prolongation 170 projecting vertically from the upper side 102 of the unit 100. This prolongation can serve as a link point for various connection means between the units of a row among one another, between a terminal unit of a row and the frame of the apparatus and/or between the units and an actuating means for changing the position of the units.

FIG. 8 shows an arrangement of two of the units 100 which are shown in FIG. 7 and which are arranged within a row and are connected to a string 250 at their prolongations 170. FIG. 8a shows a perspective view, FIG. 8b a side view, FIG. 8c a frontal view, and FIG. 8d a plan view of this arrangement.

FIG. 9a shows a section of an embodiment of an apparatus 1 in accordance with the invention which includes a row 30 having a plurality of units 100 received therein. In the embodiment shown, the apparatus furthermore has an actuating mechanism 300 with which the position of a plurality of units 100 within the row 30 can be changed. The units 100 within the row 30 are connected to one another in the manner described in more detail in FIG. 8, with the string 250 being coupled at its end region 251 to the actuating mechanism.

The actuating mechanism 300 has a roll 301 for winding up the string 250 which is supported on an axle 303 and can be actuated by a crank 302.

The actuating mechanism 300 is attached to the end face of the apparatus 1 so that all units 100 of the row 30, and optionally simultaneously the units of a plurality of other rows, can be drawn toward the actuating mechanism by actuating the crank 302 and winding up the string 250 on the roll 301. The pulling toward the actuating mechanism can correspond to a pulling apart of the units 100 so that their spacing to one another increases or it can correspond to a pushing together of the units 100 so that their spacing to one another decreases.

FIG. 9b shows a side view and FIG. 9c a plan view of the arrangement shown in FIG. 9a and described in more detail in connection with FIG. 9a.

Figure 2:
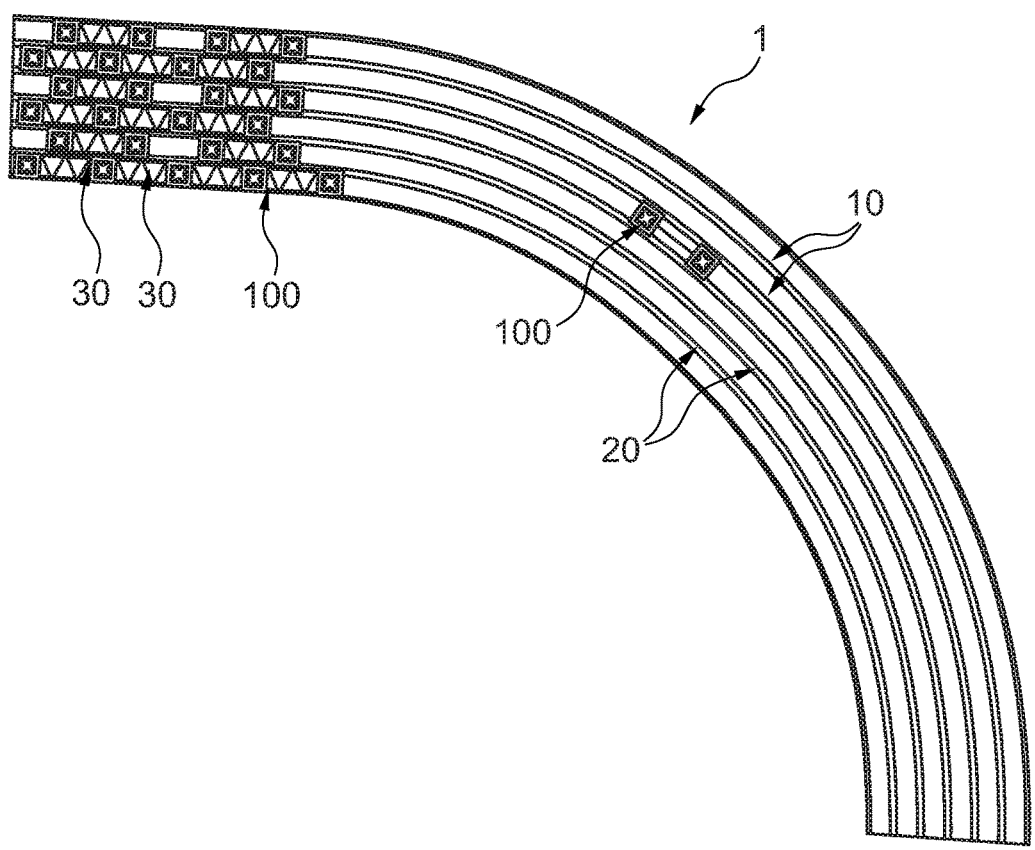
Figure 3A:
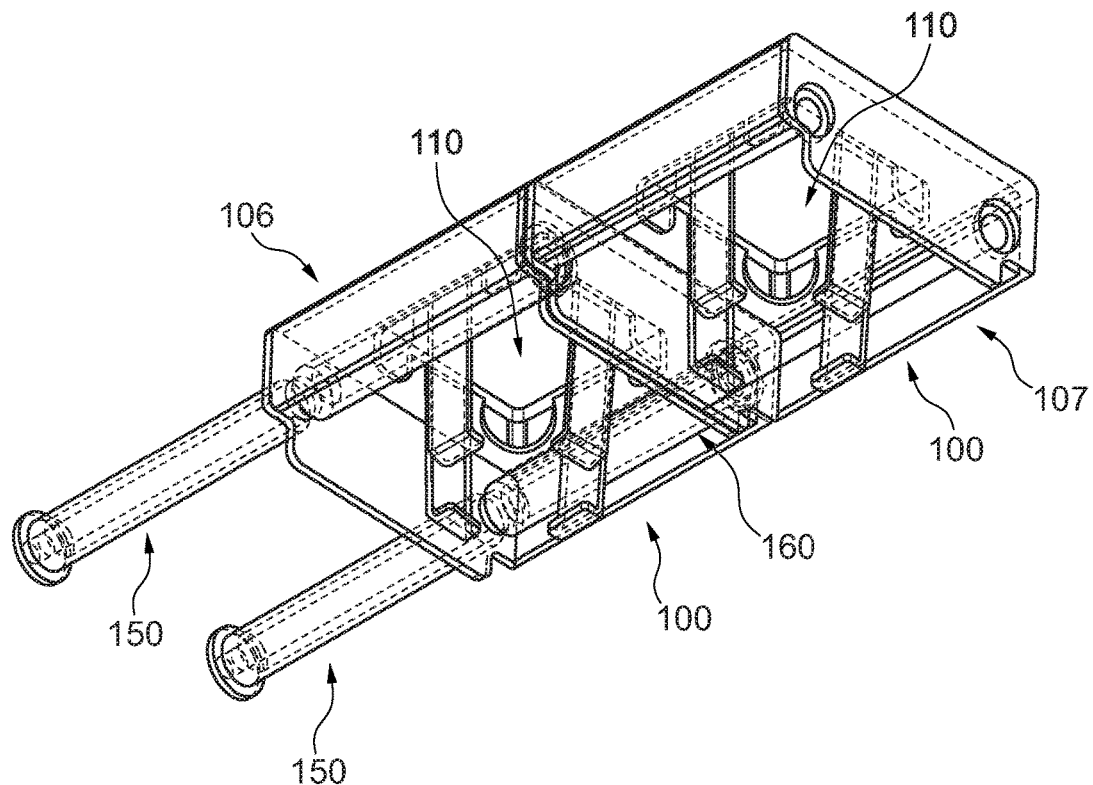
Figure 3B:
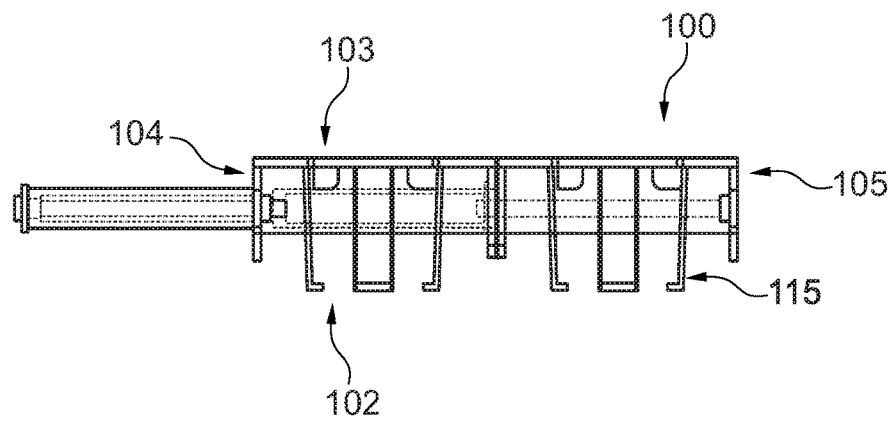
Figure 3C:
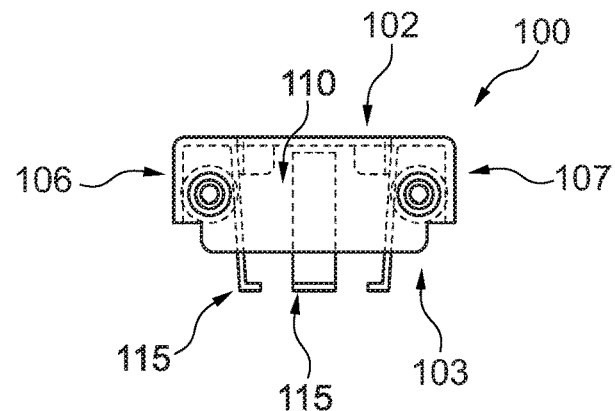
Figure 3D:
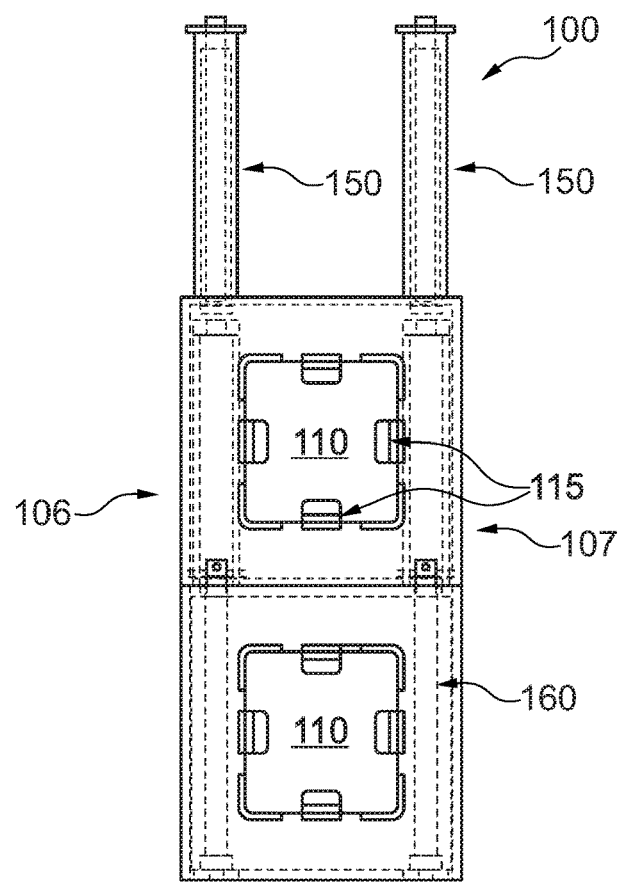
Figure 5A:
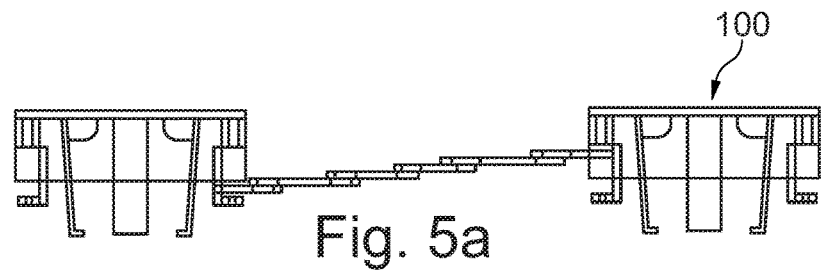
Figure 5B:
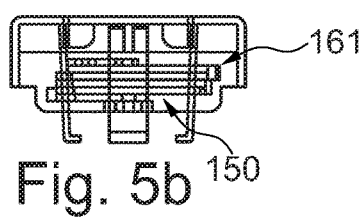
Figure 5C:
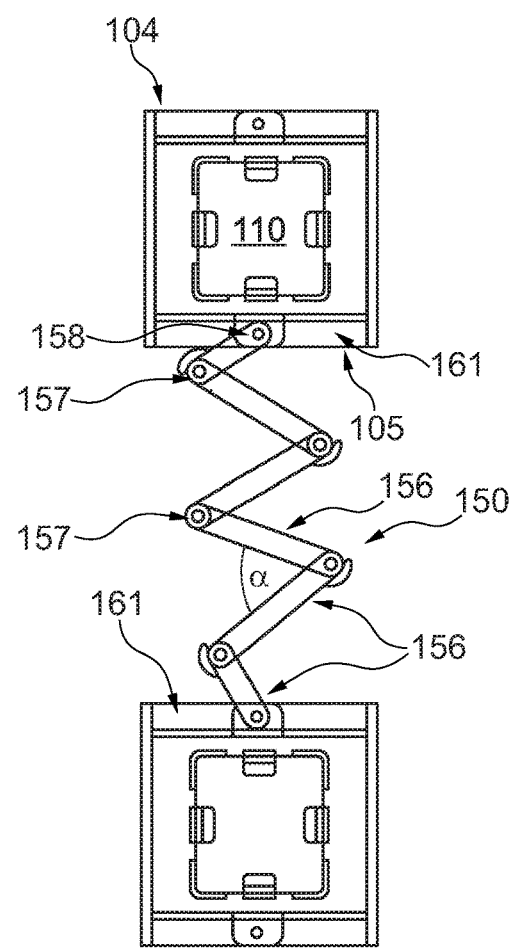
Figure 6B:
Figure 6C:
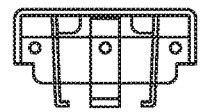
Figure 6A:
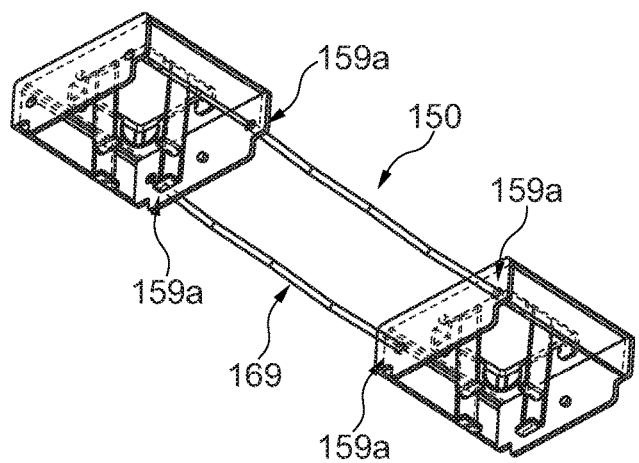
Figure 6D:
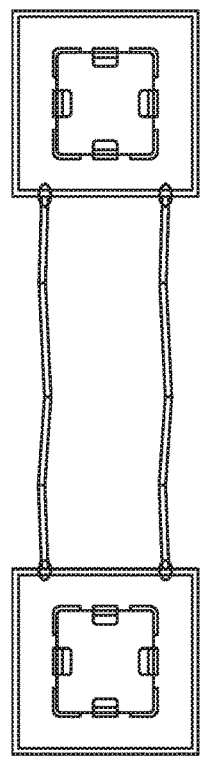
Figure 7A:
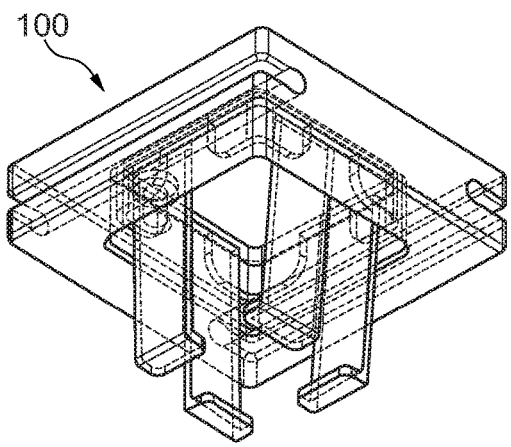
Figure 7B:
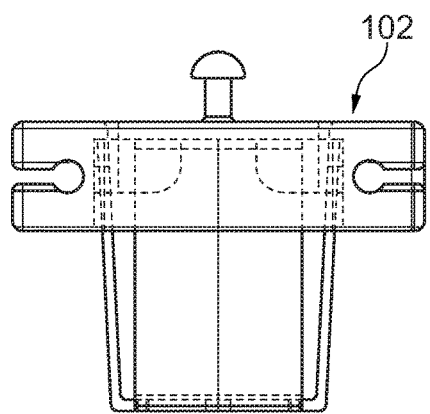
Figure 7C:
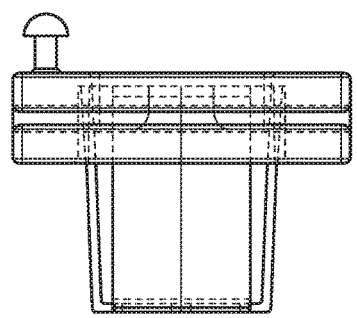
Figure 7D:
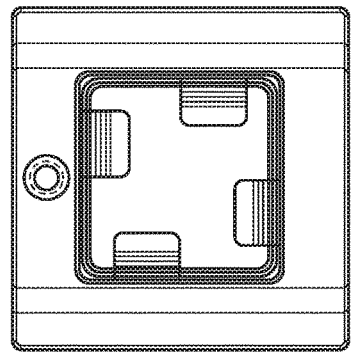
Figure 8B:
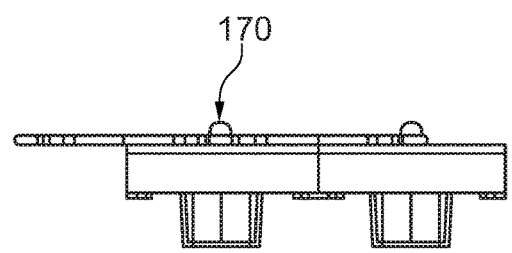
Figure 8A:
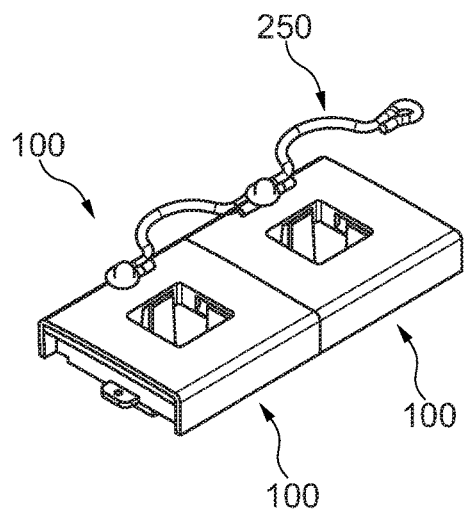
Figure 8C:
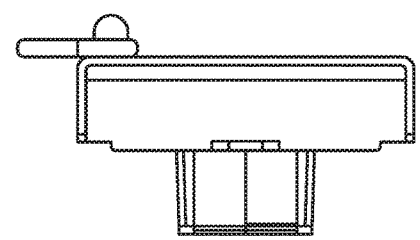
Figure 8D:
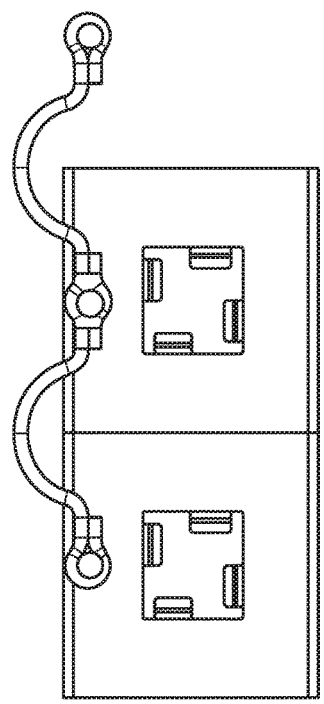
Figure 9A:
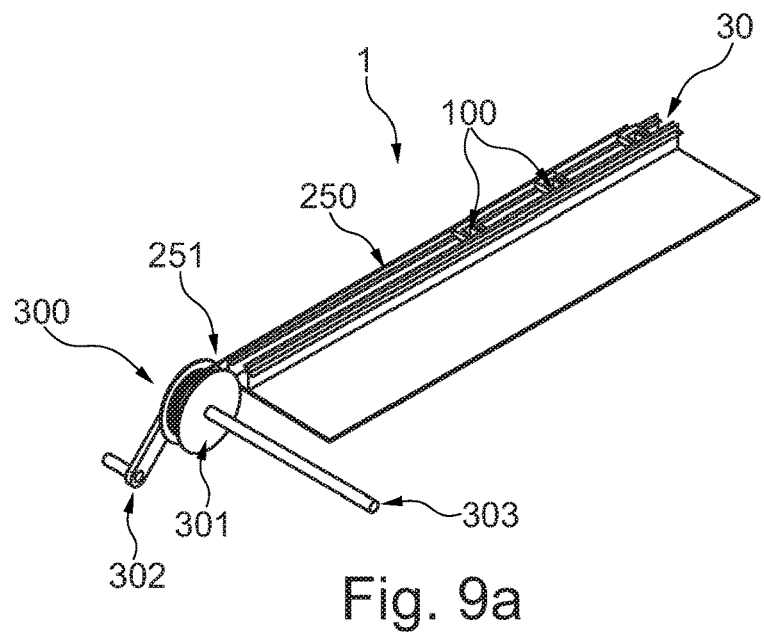
Figure 9B:
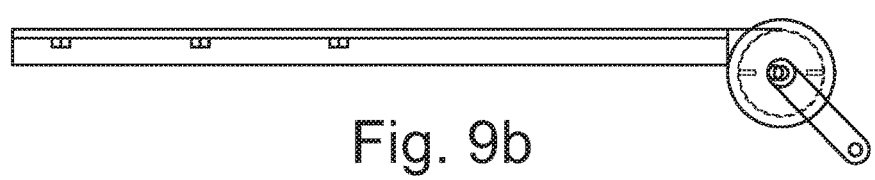
Figure 9C:
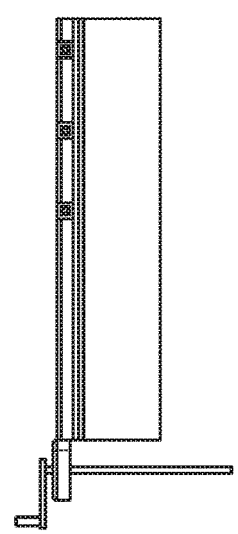
Figure 10A:
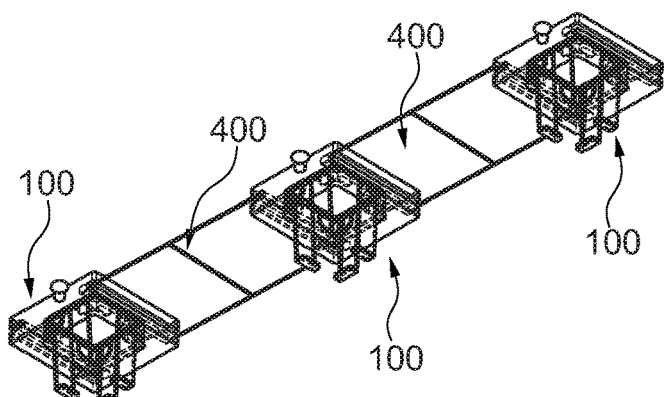
FIG. 10a shows an arrangement of three mutually spaced apart units 100 of a row of an apparatus in accordance with the invention. The structure of the units 100 is similar to the structure of the units described in connection with FIGS. 3 to 7, whereby reference is generally made to the description there.

A special feature of the arrangement shown in FIG. 10a is that the intermediate space between adjacent units is covered by a plate-shaped cover 400. It has a thin section 400a and a thick section 400b, with the thin section 400a being able to be lowered like a telescope in the thick section 400b. In this manner, the elongate extent of the cover 400 in a specific region can be adapted to a changed spacing between two adjacent units 100 whose intermediate space is covered by the cover 400.

At its ends, the cover 400 has a thickened portion 401 which can be reversibly introduced into a groove-shaped guide 402 in the units 100 and can be fastened there. The cover 400 can thus, as required, be simply added to the apparatus or removed from the apparatus and is moreover fixedly connected to the adjacent units 100 in the extent of a stretching or compressing of the units 100 within a row. Other forms of connection between the cover 400 and the units 100 are naturally conceivable.

Due to the superimposition of the intermediate space between adjacent and mutually spaced apart units 100 within a row serves to keep the substrate or the culture medium beneath the plane of the units covered and thus protected from influences from the outside even after the pulling apart of the units.

Figure 10B:
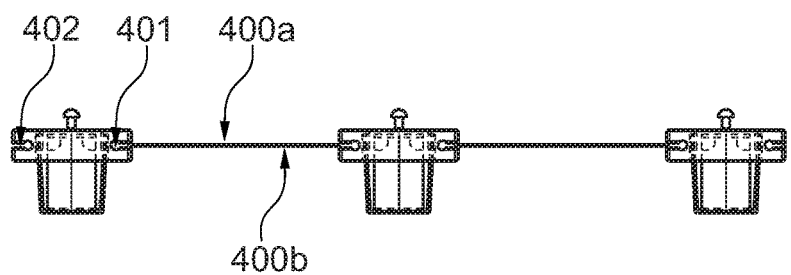
Figure 10C:
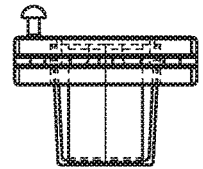
Figure 10D:
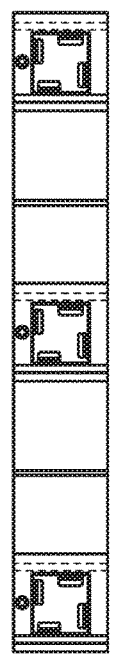

FIG. 10b shows a side view, FIG. 10c a frontal view, and FIG. 10d a plan view of the arrangement shown in FIG. 10a and described in more detail in connection with FIG. 10a.

Figure 11A:
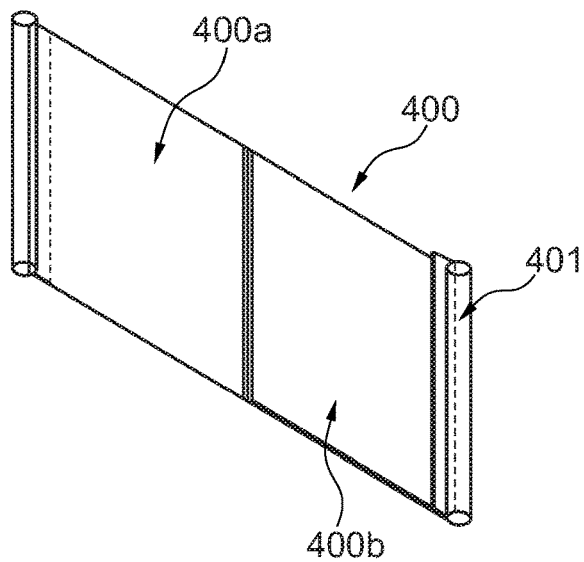
Figure 11B:
Figure 11C:
Figure 11D:
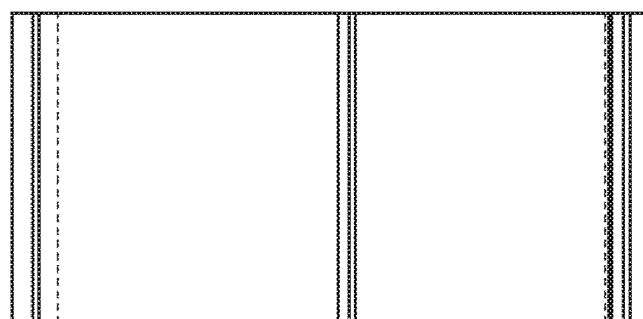

FIG. 11a shows, in a perspective view, a detailed view of the cover 400 used in the arrangement shown in FIG. 10. Reference is generally made to the description there. FIG. 11b shows a side view, FIG. 11c a frontal view, and FIG. 11d a plan view of the cover 400 shown in FIG. 11a.

The shown telescopic lowering of a thin section 400a into a thick section 400b is naturally not the only possibility of a design of such a cover which is suitable for use in an apparatus in accordance with the invention. The cover can also be elastic and planar in shape in addition to a rigid and plate-like shape. To adapt its surface to the changeable spacing between adjacent units, a folding or other deformation, for example bending, is also conceivable. A combination of these mechanisms for changing their area is also conceivable.

FIG. 12a shows a section of an embodiment of an apparatus in accordance with the invention, wherein an arrangement shown in FIG. 10 of three mutually spaced apart units 100 of a row 30 is received in the guide rails 20 of the row. Reference is made to the above description in other respects. FIG. 12b shows a side view, FIG. 12c a frontal view, and FIG. 12d a plan view of the section shown in FIG. 12a.

Figures 13A, 13B:
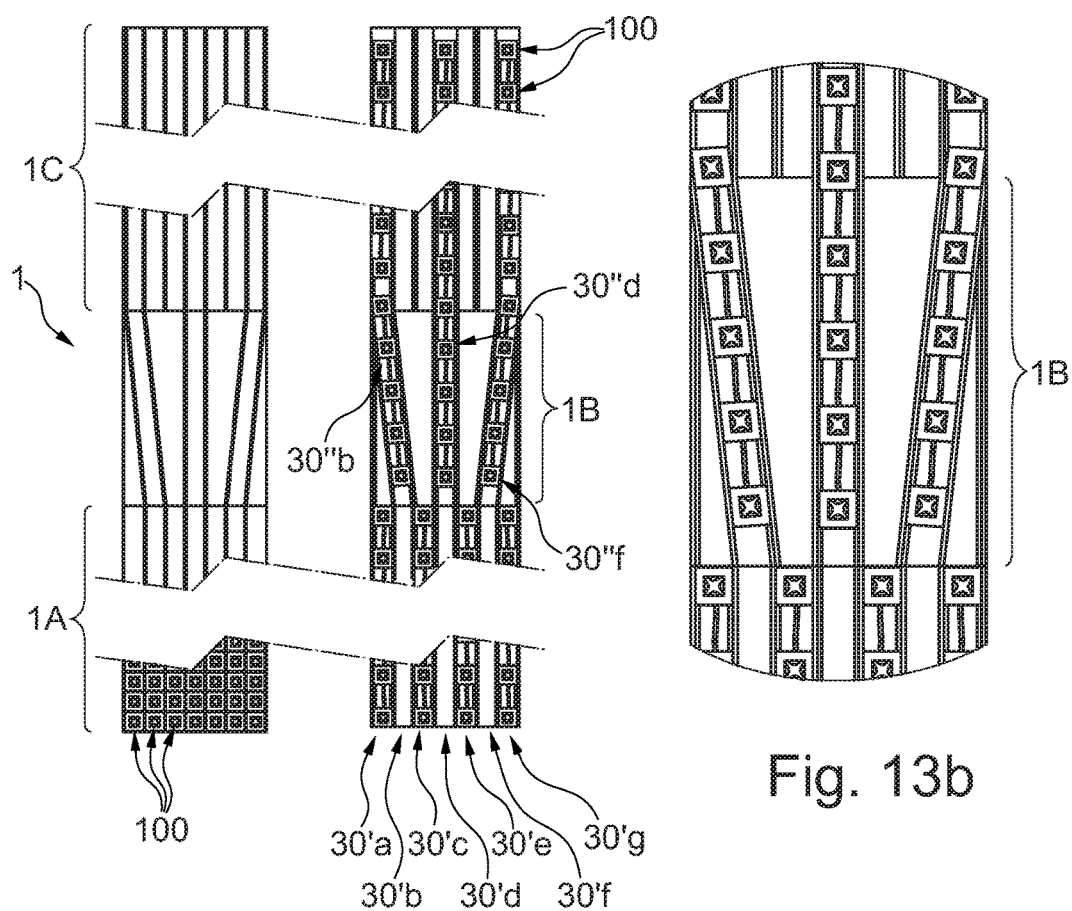

FIG. 13a shows two representations of an embodiment of the apparatus 1 in accordance with the invention with differently distributed units 100, wherein the apparatus is divided into three sections 1A, 1B and 1C. The units are located in a plurality of different rows 30a to 30g.

The first section 1A corresponds to the basic shape of the apparatus in accordance with the invention with rows 30a to 30g extending in parallel, such as has already been explained in more detail in connection with the description of FIG. 1. Reference is made in this connection to the description in this respect.

A transition section 1B is located directly adjacent to the first section 1A. In this transition region, only fewer than half the rows 30'a to 30'g originally present in the first section 1A are continued, namely the rows 30"b, 30"d and 30"f. The remaining rows 30"a, 30"c, 30"e and 30"g terminate on the transition from the first section 1A to the second section 1B. The rows 30"b, 30"d and 30"f continuing in the transition section 1B are not adjacent to one another in the first section 1A. In the transition section 1B, the rows 30"b, 30"d and 30"f originally continued in parallel no longer extend parallel to one another, but extend so that as the distance from the first section 1A increases, a spacing between them which becomes ever larger is adopted until they are distributed uniformly over the width of the apparatus with a maximum spacing from one another at the other end of the transition section 1B.

A third section 1C is located in turn directly adjacent to the transition section 1B. In this third section, those rows 30"b, 30"d and 30"f which were already continued in the transition section 1B propagate in parallel and with a maximum spacing from one another over the width of the apparatus.

All the units 100 are adjacent to one another in the first section in the right-hand illustration of FIG. 13a. This position is preferably used in the sowing and in early growth stages of the plants to keep the spatial arrangement of the seedlings as small as possible. In the left hand illustration of FIG. 13a, the units were distributed over all three sections 1A, 1B and 1C of the apparatus 1 such that they have a maximum distance from one another. In this respect, all the units 100 belonging to the rows 30"b, 30"d and 30"f are in the second section 1B and third section 1C, while the units 100 belonging to the rows 30"a, 30"c, 30"e and 30"g are distributed over the first section 1A. The units are arranged with a maximum offset to one another within the respective regions to obtain a spacing of the units which is as large as possible. This position is preferably used in the late growth stages of the plants to maximize the spacing of the plants from one another.

FIG. 13b shows the transition section 16 of the arrangement shown in FIG. 13a and the adjacent regions of the first section 1A and of the third section 1C in a magnified illustration.

Figure 14A:
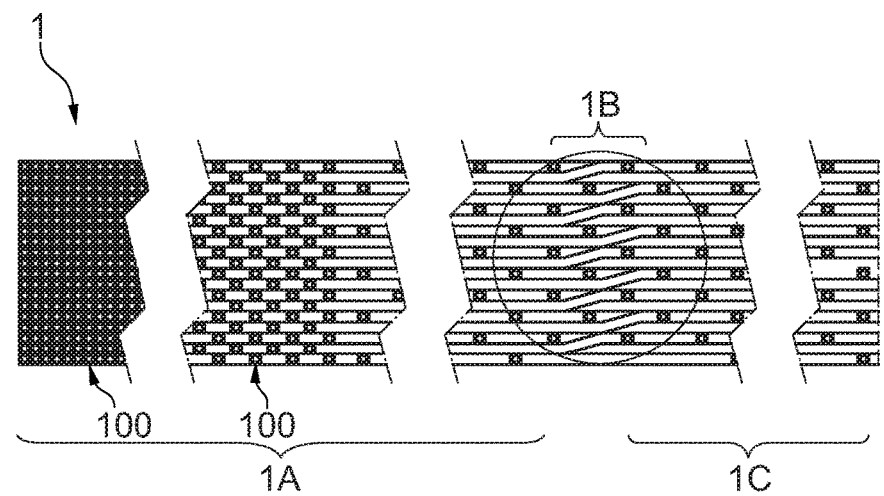

FIG. 14a shows a further embodiment of the apparatus 1 in accordance with the invention with units 100 distributed therein, wherein the apparatus is divided into three sections 1A, 1B and 1C. The representation is interrupted a plurality of times in its horizontal extent, wherein respective different distribution states of the units 100 are shown in each fragment within the apparatus. These different distribution states were already discussed in connection with FIG. 13 so that reference is made to the description there in this connection.

Figure 14B:
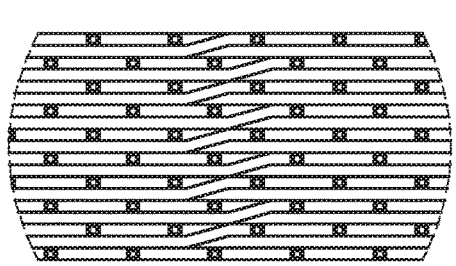

In contrast to the embodiment of the arrangement shown in FIG. 13, the special feature of the arrangement shown in FIG. 14 lies in the design of the transition section 16 which is also shown enlarged again in FIG. 14b and in particular 14c.

The transition section 1B is located directly adjacent between the first section 1A and the third section 1C. In this transition section, every second row of the rows originally present in the first section 1A is continued, whereas the remaining rows terminate at the transition from the first section 1A to the second section 1B. The rows continuing in the transition section 1B are not adjacent to one another in the first section 1A. In the transition section 1B, the continued rows continue to extend parallel to one another, but their direction is changed with respect to the direction originally adopted in section 1A. As the distance from the first section 1A increases, these rows are then offset until they have been displaced laterally at the other end of the transition section 1 by the width of a total row and are distributed uniformly with a maximum spacing from one another over the width of the apparatus. In the third section 1C, those rows which run through the second section 1B again extend parallel to one another in that direction which they had originally adopted in the first section 1A.

Figure 14C:
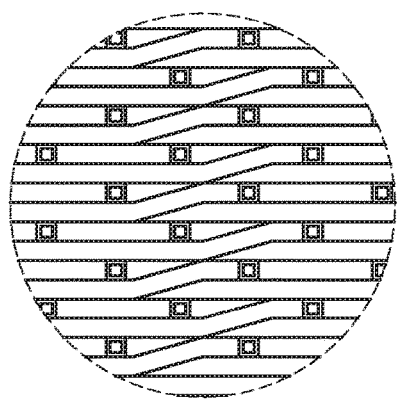
Figure 14D:
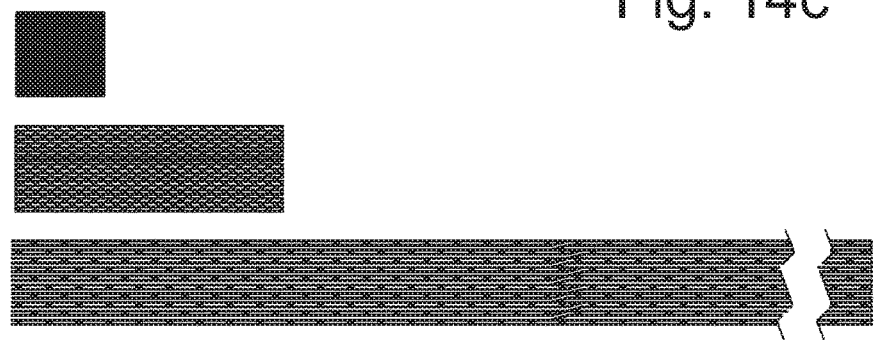

FIG. 14b shows the embodiment of the apparatus shown in FIGS. 14a to 14c with fragment of respective different distribution states of the units 100 within the apparatus. All the units 100 are adjacent to one another in the first section 1A in the top illustration of FIG. 14d. This position is preferably used in the sowing and in early growth stages of the plants to keep the spatial extent of the seedlings as small as possible. All units 100 are disposed with a maximum offset to one another in the first section 1A in the middle illustration of FIG. 14d. This position is preferably used in slightly advanced growth stages of the plants. In the lower illustration of FIG. 14d, the units were distributed over all three sections 1A, 1B and 1C of the apparatus 1 such that they have a maximum distance from one another. In this respect, all units 100 belonging to the rows continued over the extent of the second section 1B and third section 1C are in the second section 1B and third section 1C, whereas the units 100 belonging to the remaining rows are distributed over the first section 1A. The units are arranged with a maximum offset to one another within the respective regions. This position is preferably used in the late growth stages of the plants to maximize the spacing of the plants from one another.

In summary, the increasing space requirements of the plants resulting from the growth of the plants can be dealt with ideally and simply using an apparatus in accordance with the invention. A large-area harvest and watering can be avoided. The transmission of pests or bacteria from one plant to the next, which can be due to a small distance of the plants from one another, is effectively reduced.

The apparatus in accordance with the invention can be a component of a total system in which, for example, seedlings or young plants or shoots can be inserted into the units, in which the distance of the units is increased after a specific time and the units are then moved to a harvesting station or the like of the total system in which the units or the plants are removed from the units. In this respect, the present invention also relates to such a total system and/or to the use of the apparatus in such a total system.

The invention claimed is:
1. An apparatus for breeding plants comprising:
a plurality of units, each unit being adapted to receive a plant;
a plurality of parallel tracks, each track comprising a plurality of the units arranged in a row along a common bearing to permit the units to slide or roll along a straight or curved line so that spacing between adjacent units can be changed;
wherein adjacent units along each track are connected to one another by a connecting element that defines a maximum distance;

wherein adjacent units are in mutual contact along a side wall of said adjacent units in a first state;

wherein the connecting element is configured such that adjacent units along each track cannot be spaced further apart than the defined maximum distance in a second state; and wherein the connecting element is a telescopic rod, and at least one of the units has at least one interiorly disposed reception region dimensioned and configured to receive the connecting element.

2. An apparatus in accordance with claim 1, wherein the apparatus has at least n further rows in respective further tracks which are arranged parallel to one another, where n is a whole number 1 or greater, and wherein at least two further units for the reception of a plant are arranged in each of the n further rows such that spacing of the further units from one another is changeable.

3. An apparatus in accordance with claim 2, wherein at least one of the rows has at least m units, where m is a whole number 1 or greater and at least m−1 of the m units are movable relative to at least one other unit of the row so that a distance from one another is changeable.

4. An apparatus in accordance with claim 2, wherein the rows define a horizontal plane of the apparatus and the movable units are displaceable along the respective tracks.

5. An apparatus in accordance with claim 2, wherein the tracks define a direction of movement of the units in the apparatus and extend in parallel from at least two rows.

6. An apparatus in accordance with claim 5, wherein the tracks which define the direction of movement of the units in the apparatus extend in parallel from all rows of the apparatus.

7. An apparatus in accordance with claim 2, wherein a first position, a second position or a third position of at least two units is determinable within one row, a plurality of rows or all rows.

8. An apparatus in accordance with claim 7, wherein the second position of at least two units of at least two adjacent rows is defined so that the units of two adjacent rows are offset along a direction of movement with respect to one another within a row.

9. An apparatus in accordance with claim 8, wherein the second position of at least two units of at least two adjacent rows is defined so that the units of two adjacent rows are offset along the direction of movement by half of a defined maximum spacing of the two units with respect to one another within a row.

10. An apparatus in accordance with claim 7, wherein the third position of at least two units of at least two adjacent rows, is defined so that of the units of one row of the units of two adjacent rows are located in a first section and the units of a second row of two adjacent rows are located in a second section.

11. An apparatus in accordance with claim 2, wherein the apparatus has an actuating mechanism with which the position of all units within the at least one row, or the position of all units within the plurality of rows can be changed and determined together.

12. An apparatus in accordance with claim 2, wherein said further rows are arranged parallel to the first row.

13. An apparatus in accordance with claim 2, wherein the rows define a horizontal plane of the apparatus, wherein at least two rows of units are provided which extend parallel to one another, and wherein the units are movable in the same direction.

14. An apparatus in accordance with claim 1, wherein the apparatus has at least two mutually adjacent sections along an extent of the tracks, wherein at least two tracks extend parallel to one another in the first section and wherein the spacing of at least two tracks from one another in the second section is changeable.

15. An apparatus in accordance with claim 14, wherein the number of the tracks reduces, on the transition from the first section to the second section.

16. An apparatus in accordance with claim 15, wherein the apparatus has at least three mutually adjacent sections along the extent of the tracks, and wherein the third section has a number of tracks which preferably extend parallel to one another and which is reduced, in comparison with the first section.

17. An apparatus in accordance with claim 1, wherein said bearing includes a sliding guide having two rails.

18. An apparatus in accordance with claim 1, wherein all the units of the row are movable relative to the apparatus.

19. An apparatus in accordance with claim 18, further comprising a terminal unit of the row which is not movable relative to the apparatus.

20. An apparatus in accordance with claim 1, wherein the apparatus has an actuating means with which the spacing of at least two units, can be changed simultaneously or successively.

21. An apparatus in accordance with claim 20, wherein the spacing of all the units can be changed simultaneously or successively.

22. An apparatus in accordance with claim 1, wherein at least two adjacent movable units are connected within the row by the connecting element; wherein a maximum distance between the connected units is defined and is changeable by the connecting element.

23. An apparatus in accordance with claim 22, wherein one or more of the connecting elements are integrally connected to one or more units.

24. An apparatus in accordance with claim 22, wherein one unit, a plurality of units, or all the units have one or more of the reception regions for the connecting element.

25. An apparatus in accordance with claim 1, wherein a cover is located between adjacent units of the row which covers an intermediate space between the units.

26. An apparatus in accordance with claim 1, wherein the connection element has a first end and a second end, the maximum distance defined between the first end and the second end.

* * * * *